_Patented Oct. 8, 1946_

2,408,828

UNITED STATES PATENT OFFICE 2,408,828

STEROIDAL COMPOUNDS AND METHOD FOR OBTAINING THE SAME

Romeo B. Wagner, State College, Pa., assignor to Parke, Davis & Company, Detroit, Mich., a corporation of Michigan No Drawing. Application May 15, 1944,
Serial No. 535,749

4 Claims. (Cl. 260—397.3)

This invention relates to the preparation of new compounds of the pregnane series which are oxygenated in the nuclear position 12. These compounds are useful intermediates in the preparation of hormone products.

In the copending Patent No. 2,352,852, issued July 4, 1944, a method was described by which steroidal sapogenins may be isomerized to pseudo-sapogenins and these pseudo-sapogenins further mildly oxidized and hydrolyzed to give 16-17 unsaturated 20 keto pregnane series compounds. The transformations may be indicated as follows:

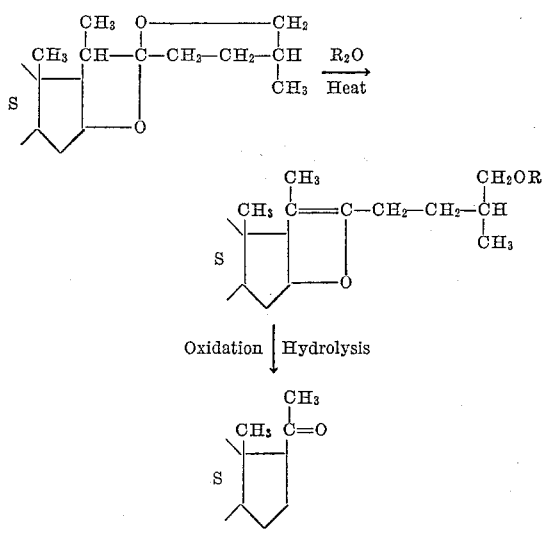

where S represents the rings A, B and C of the steroid nucleus and R is an acyl radical ($R_2O$ representing an acyl anhydride).

I have now found that these reactions may also be applied to newly discovered steroidal sapogenins which are oxygenated in Ring C at position 12, e. g. hecogenin (12-ketotigogenin), rockogenin (12-hydroxy-tigogenin) and furcogenin (12-hydroxy-smilagenin). The corresponding pseudo-sapogenins are described in my copending application Serial No. 535,757, filed May 15, 1944. Rockogenin is described in my copending application Serial No. 535,758, filed May 15, 1944. See J. Am. Chem. Soc. 65, 1199 (1943).

The invention may be illustrated by the following example:

_Pseudohecogenin._—A sealed tube containing 5 g. of hecogenin and 15 cc. of acetic anhydride was heated at 200° for 10 hours. The solvent was removed in vacuo and the solid residue was treated with a solution of 5 g. of potassium hydroxide in 500 cc. ethanol for thirty minutes. The product was ether extracted and the ethereal solution was washed and evaporated. The acetone solution of the residue after treatment with Norite was concentrated and cooled to give white needles, M. P. 189–191°; yield 2.6 g.

Anal.: Calc'd for $C_{27}H_{42}O_4$: C, 75.3; H, 9.8. Found: C, 75.2; H, 9.9.

_16-allo-pregnen-3,12,20-trione._—To a solution of 1 g. of pseudohecogenin in 40 cc. of acetic acid at 15° was added 0.9 g. of chromic anhydride dissolved in 10 cc. 80% acetic acid. A dark brown solid precipitated. Within twenty minutes this solid material dissolved. The mixture was allowed to stand at 25° a total of 90 minutes with frequent shaking. The product was extracted with ether and the ethereal solution was washed thoroughly with water to remove the acetic acid. The ether was removed and the solid residue was treated with 100 cc. of a 2% alcoholic potassium hydroxide solution for thirty minutes. The mixture was cooled and ether extracted. After washing and concentrating, the ethereal solution was cooled to give fine white plates, M. P. 256–258°; yield 120 mg.

Anal.: Calc'd for $C_{21}H_{28}O_3.H_2O$: C, 72.8; H, 8.7. Found: C, 72.6, H, 8.8.

_Allo-pregnen-3,12,20-trione._—A solution of 50 mg. of 16-allo-pregnen-3,12,20-trione in 300 cc. of ether was shaken with hydrogen and one gram 3% palladium-barium sulphate catalyst at room temperature and 3 atm. for two hours. The mixture was filtered through kieselguhr and the filtrate was concentrated to give white crystals, M. P. 261–264°. This material was insoluble in both hot and cold aqueous potassium hydroxide.

Anal.: Calc'd for $C_{21}H_{30}O_3 \cdot H_2O$: C, 72.4; H, 9.3. Found: C, 72.9; H, 9.1.

The example given is for the purpose of illustrating the invention and can be varied considerably for the purpose of obtaining different pregnane compounds. For example, if pseudohecogenindiacetate be oxidized directly with subsequent hydrolysis the product of the reaction sequence will be 3-β-hydroxy-12, 20-diketo-16-allo-pregnene. In the same manner if pseudo-rockogenin-tri-acetate be oxidized with subsequent hydrolysis the end product is 3,12-dihydroxy-20-keto-16-allo-pregnene. Oxidation of pseudo-rockogenin followed by hydrolysis yields 3,12,20-tri-keto-16-allo-pregnene. Processing of pseudo-furcogenin diacetate similarly yields 3-hydroxy-12-20-di-keto-16-pregnene while oxidation of the free genin yields as final product 3,12,20-tri-keto-pregnene. The hydroxylated pregnenes obtained in this manner may be re-acylated to obtain ester derivatives for example by boiling with acetic anhydride.

While the oxidizing agent described, chromic acid in acetic acid at room temperature, is the preferred agent for carrying out this step other agents capable of rupturing a carbon-carbon double bond may also be used for example ozone, per-acids and their salts and the like.

One may use any of the known organic agents for converting alcoholic OH to an ester or ether or like group capable of hydrolysis to give OH. Such agents are, for example, organic acid halides, acetyl chloride, benzoyl chloride, furoyl chloride, butyric or other lower fatty acid anhydride, etc. One can form an alkali metal alcoholate of the sapogenin hydroxy compound and then react it with an alkyl halide to form an ether. One can also react the hydroxyl containing sapogenin with a compound such as triphenyl methyl chloride to form the so-called trityl ether type. Halogenating agents, such as sulfuryl chloride, phosphorus chlorides and the like may also be used to convert OH to halogen.

The main transformations occurring in the above examples starting with hecogenin, rockogenin and furcogenin may be represented as follows:

Starting with hecogenin:

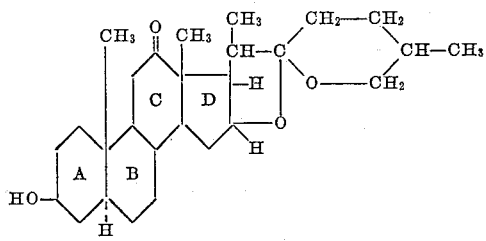

Hecogenin $R_2O$ and heat

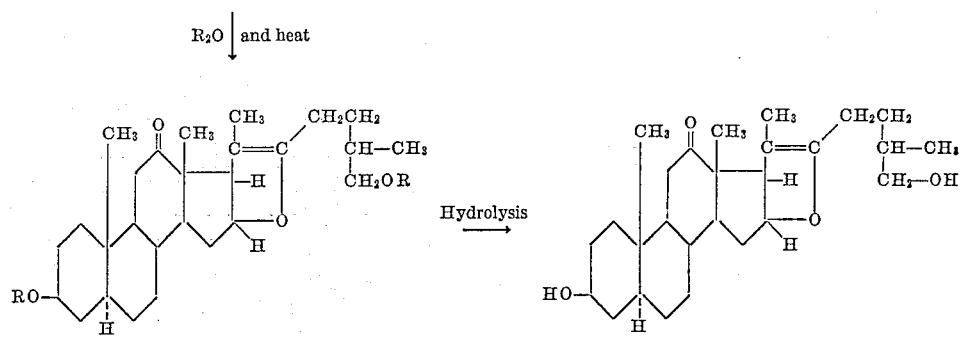

Pseudohecogenin diacylate        Pseudohecogenin oxidation and hydrolysis          oxidation and hydrolysis

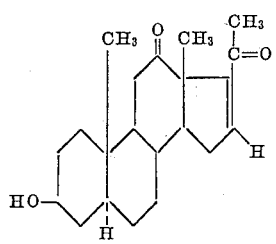    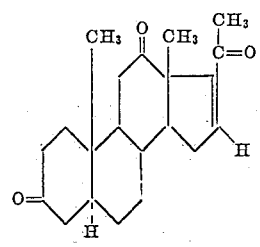

3-β-hydroxy-12,20-diketo-16-allo-pregnene         16-allo-pregnene-3,12,20-trione Starting with rockogenin:

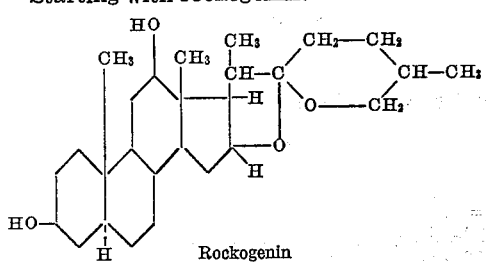

Rockogenin

R₂O ↓ and heat

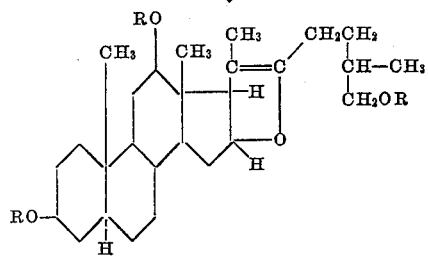

Pseudo-rockogenin triacylate oxidation ↓ and hydrolysis

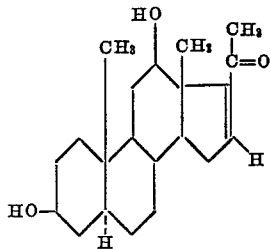

3,12-dihydroxy-20-keto-
16-allo-pregnene
(16-allo-pregnene-3,12-
diol-20-one)

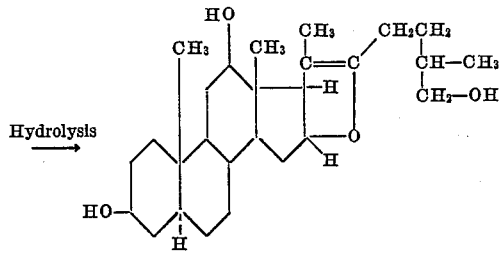

Pseudo-rockogenin oxidation ↓ and hydrolysis

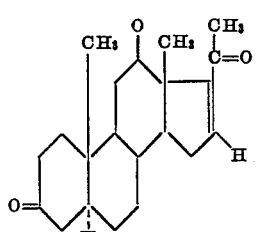

3,12,20-triketo-16-
allo-pregnene

Hydrolysis →

Starting with furcogenin:

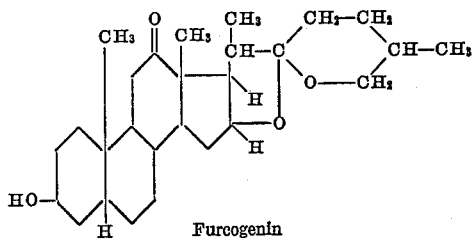

Furcogenin

R₂O ↓ and heat

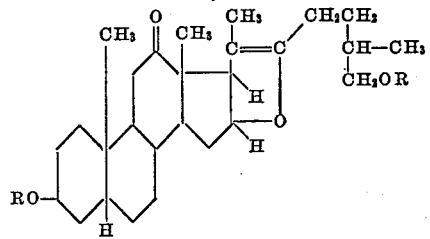

Pseudofurcogenin diacylate

Oxidation ↓ and hydrolysis

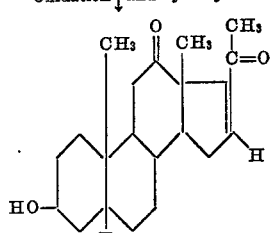

3-β-hydroxy-12,20-diketo-16-pregnene
(16-pregnene-3-ol-12,20-dione)

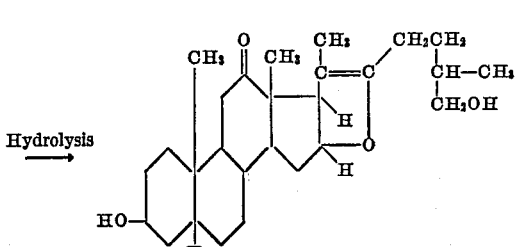

Pseudofurcogenin

Oxidation ↓ and hydrolysis

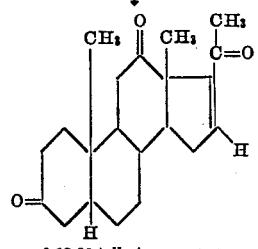

3,12,20-triketopregnene

Hydrolysis →

What I claim is:
1. A compound represented by the following formula:
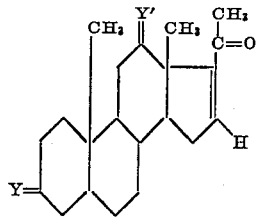
where Y and Y' are members of the class
groups hydrolyzable to
$$\begin{matrix} OH \\ \diagup \\ H \end{matrix}$$
and =O.
2. 16-Allo-pregnene-3,12,20-trione.
3. 16-Pregnene-3-ol-12,20-dione.
4. 16-Allo-pregnene-3,12-diol-20-one.
ROMEO B. WAGNER.